(12) United States Patent
Schweiger

(10) Patent No.: US 6,179,299 B1
(45) Date of Patent: Jan. 30, 2001

(54) MULTI-LAYERED GASKET HAVING MESHING GRIPPING MEMBERS

(75) Inventor: David J. Schweiger, Downer Grove, IL (US)

(73) Assignee: Dana Corporation, Toledo, OH (US)

(*) Notice: Under 35 U.S.C. 154(b), the term of this patent shall be extended for 0 days.

(21) Appl. No.: 09/221,101

(22) Filed: Dec. 28, 1998

(51) Int. Cl.$^7$ ................................ F16J 15/08; F02F 11/00
(52) U.S. Cl. ............................................................. 277/598
(58) Field of Search ................................... 277/595, 598, 277/609, 654, FOR 248, 591

(56) References Cited

U.S. PATENT DOCUMENTS

| | | |
|---|---|---|
| 3,606,361 | 9/1971 | Pohl et al. . |
| 4,121,846 | 10/1978 | Skrycki . |
| 4,335,890 | 6/1982 | Nicholson . |
| 4,372,564 | 2/1983 | Nicholson . |
| 4,390,185 | 6/1983 | Nicholson . |
| 4,817,967 | * 4/1989 | Belter . |
| 5,222,745 | * 6/1993 | Akbar et al. . |
| 5,626,348 | * 5/1997 | Takada et al. . |

FOREIGN PATENT DOCUMENTS

| | | |
|---|---|---|
| 1923482 | * 11/1970 | (DE) . |
| 4116125 | * 11/1992 | (DE) . |
| 4240132 | * 6/1994 | (DE) . |

* cited by examiner

*Primary Examiner*—Anthony Knight
*Assistant Examiner*—John L. Beres
(74) *Attorney, Agent, or Firm*—Rader, Fishman & Grauer PLLC

(57) ABSTRACT

In a sealing gasket, multiple metallic gasket layers are interlocked together by cooperating self-aligning gripping members that mesh together. First and second gasket layers each have an engagement surface, a sealing surface and an aperture therethrough. Each engagement surface has disposed thereon a plurality of gripping members extending radially outwardly from a periphery of the apertures. The engagement surfaces of the first and second gasket layers are brought into face-to-face engagement such that the gripping members of the first gasket layer mesh together with the gripping members of the second layer to maintain the proper alignment of the first and second gasket layers and prevent lateral movement of the gasket layers with respect to one another.

21 Claims, 3 Drawing Sheets

MULTI-LAYERED GASKET HAVING MESHING GRIPPING MEMBERS

FIELD OF THE INVENTION

The present invention relates to improvements in gasket assemblies. More particularly, the present invention relates to a multiple gasket layers that include self-aligning gripping members that cooperate to positively secure the gasket layers together.

BACKGROUND OF THE INVENTION

Gaskets are often used to seal mating mechanical components. In one application, a cylinder head gasket for an internal combustion engine is formed from a plurality of metallic gasket layers laminated together. In addition to providing a seal between the engine block and the cylinder head of an internal combustion engine, the metallic layers further provide structural support, as well as radial strength to resist gasket blow-out due to combustion chamber generated pressures.

Typically, the metallic layers are laminated together by welding to insure that the gasket layers remain properly secured and aligned during operation of the engine. However, welding is undesirable for a number of applications. For example, welding is a time consuming process that involves specialized tooling, thus increasing manufacturing costs. Further, due to the high weld temperatures generated, the metallic layers may become warped, thereby compromising sealing effectiveness. Additionally, weld beads formed by the welding operation may interfere with mating members before they are fully tightened together, thereby reducing the force available for sealing the gasket layers.

To avoid the difficulties associated with welding, it has been known to provide a metallic gasket with a plurality of bending strips of a first metal plate that engage holes in a second mating metal plate to connect the first and second metal plates together. While the use of bending strips is less expensive than welding, a bending strip produces localized stress loading, which may compromise gasket sealing effectiveness over time. Further, the edges of the bending strip are unprotected. Therefore, the bending strip may become accidentally dislodged from the hole or otherwise damaged. In addition, the bending strips often have limited effectiveness in gaskets that are subject to high frictional forces. The frictional forces may cause buckling and sliding of the metallic plates, thereby resulting in the bending strips becoming partially disengaged from the first plate. Thus, once again, sealing effectiveness is potentially compromised.

Another known gasket assembly includes providing a spacer ring disposed between each gasket layer. The spacer ring is formed with annular serrations on its opposite surfaces. When the gasket assembly is positioned between the cylinder head and the engine block, the compression forces therebetween cause the serrations of the spacer plate to deform and grip the gasket layers to hold the gasket layers together and increase sealing effectiveness. However, there is no means for positively locking the plates to one another when significant vibrations result from engine operation. Thus, the frictional forces deforming the spacer ring serrations against the gasket layers may be overcome such that the gasket layers slide apart from one another during engine operation, resulting in reduced sealing effectiveness and possible engine damage. Further, there is no mechanism for insuring proper gasket layer alignment prior to compression.

Therefore, there exists a need for effectively locking gasket layers together such that frictional forces do not compromise the alignment or sealing effectiveness.

SUMMARY OF THE INVENTION

The present invention is directed to a multiple layer sealing gasket for sealing mating mechanical components, wherein the gasket layers are provided with meshing gripping members that operate to properly align and positively secure the gasket layers together.

The sealing gasket has at least two metallic gasket layers, a first gasket layer and a second gasket layer. The first and second gasket layers are each provided with a plurality of corresponding bolt holes and combustion bores extending therethrough. The bolt holes of the gasket layers are positioned so as to be aligned with one another, as well as with corresponding bolt holes in the mating mechanical components being sealed.

In accordance with the invention, each gasket layer further includes a plurality of gripping members positioned radially outwardly from a periphery of the bolt holes. The gripping members are disposed on engagement surfaces of each gasket layer, opposite to sealing surfaces that abut the mating mechanical components, so as to extend outwardly and generally perpendicular to the engagement surface. In a preferred embodiment, the gripping members have a generally V-shaped cross-section that is defined by alternating troughs and peaks. The troughs of each gasket layer are complimentary to the peaks of the other gasket layer such that the troughs of one gasket layer mesh together with the peaks of a mating gasket layer when the engagement surfaces of the respective gasket layers are brought into face to face engagement during assembly between the mating mechanical components. A fastener, such as a bolt, is positioned through the bolt holes in the first and second gasket layers and the mechanical components to secure the mating mechanical components together. The fastener and mechanical component serve to exert a compression force on the gasket layers, effectively trapping the peaks within the troughs and preventing the gasket layers from sliding apart during operation. Thus, as the troughs and peaks mesh together, there is no need to perform a separate bonding operation to laminate the gasket layers together.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
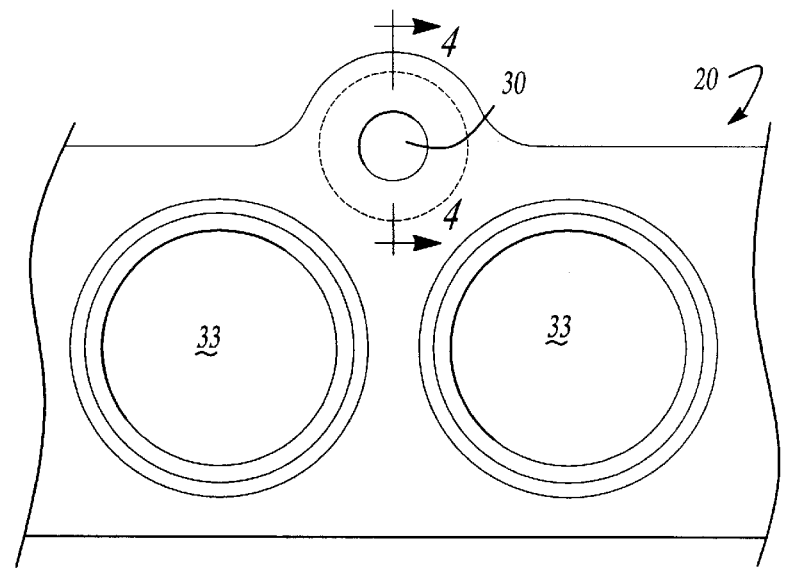
FIG. 1 is a plan view of a multiple layer cylinder head gasket for a combustion engine.

FIGS. 1–4 disclose a multi-layered sealing gasket 20 for sealing mating mechanical components 22 and 24. In the disclosed embodiment, gasket 20 is a cylinder head gasket used for sealing a cylinder head and an engine block. However, it is understood that the present invention is not limited to cylinder head gaskets and may be used with other gasket applications, such as exhaust manifolds. Because seals on cylinder head gaskets and exhaust manifold gaskets must withstand high temperatures, the gasket 20 is typically formed from metal, and usually includes multiple metal layers. Typically, the metal layers of the gasket 20 are sized and shaped to fit and seal a corresponding mating surface. The outermost layers of gasket 20 may further include embossments, folds or other surface features designed to improve the fit, wear and sealing ability of gasket 20.

Gasket 20 includes at least two metallic gasket layers, a first gasket layer 26 and a second gasket layer 28. Each gasket layer 26 and 28 may be formed from different metals. However, it is preferred that both first and second gasket layers 26 and 28 are formed from stainless steel due to its strength and durability. The first and second gasket layers 26 and 28 are provided with a plurality of corresponding bolt holes 30 for receiving a bolt fastener 32, and a plurality of combustion bores 33 extending therethrough. The mating components 24 and 26 are similarly provided with bolt holes 34 that correspond to bolt holes 30, to be explained in greater detail below.

Figure 5:
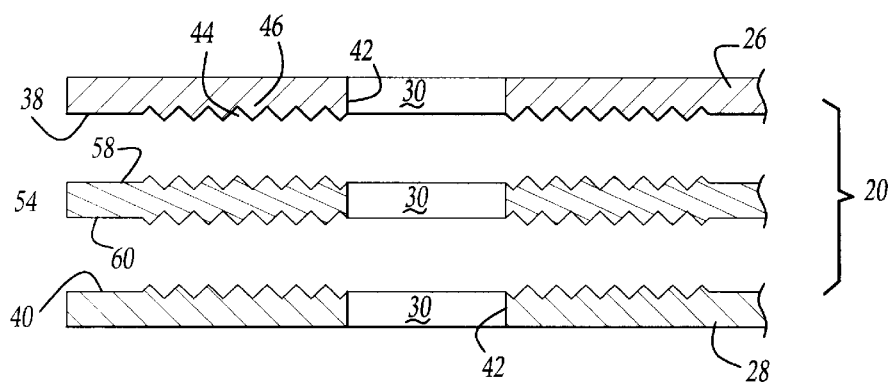
FIG. 5 is a blown-up cross-sectional view of a three layer cylinder head gasket utilizing the meshing gripping members of the present invention.
Figure 6:
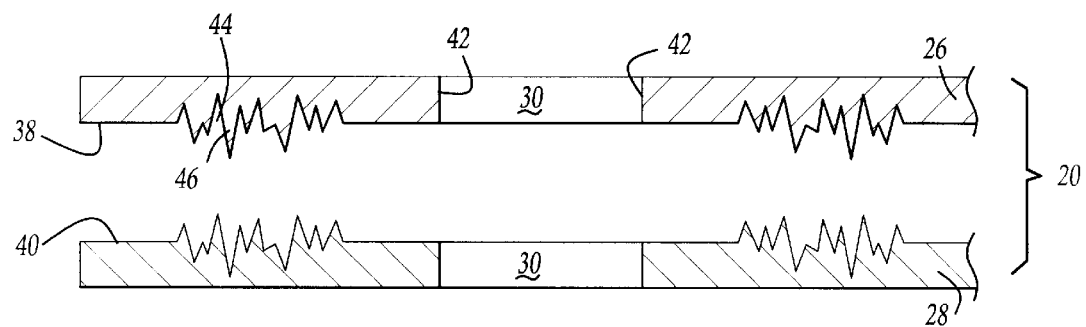
FIG. 6 is a blown-up cross-sectional view of an alternative embodiment of the meshing gripping members.

In accordance with the present invention, gasket layers 26 and 28 are further provided with a plurality of gripping members 36. Gripping members 36 are disposed on engagement surfaces 38 and 40 of first and second gasket layers 26 and 28, respectively. Gripping members 36, which may be formed by knurling or other suitable operation, are positioned radially outwardly from a periphery 42 of bolt holes 30, as seen best in FIGS. 3–5, and extend outwardly from and generally perpendicular to engagement surfaces 38 and 40. Gripping members 36 may be positioned directly adjacent bolt holes 30 (FIGS. 3–4) or spaced radially outwardly a predetermined distance from periphery 42 (FIG. 6). In one preferred embodiment, gripping members 36 include equally spaced apart alternating troughs 44 and peaks 46, such that gripping members 36 have a generally V-shaped cross-section. It is understood, however, that other suitable cooperating cross-sectional shapes such as wave shapes, may be employed without departing from the present invention. In fact, a unique orientation of the gripping members 36 such that the gasket layers 26 and 28 only align when the gripping members 36 are placed in a predetermined position may be preferred under some circumstances to insure proper gasket layer alignment.

Figure 3:
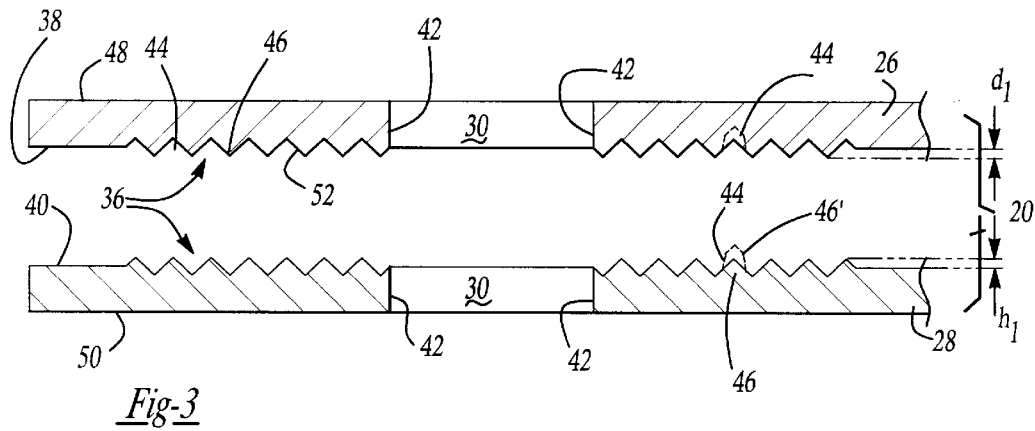
FIG. 3 is a blown up cross-sectional view of the gasket layers depicting the meshing gripping members of the present invention.
Figure 4:
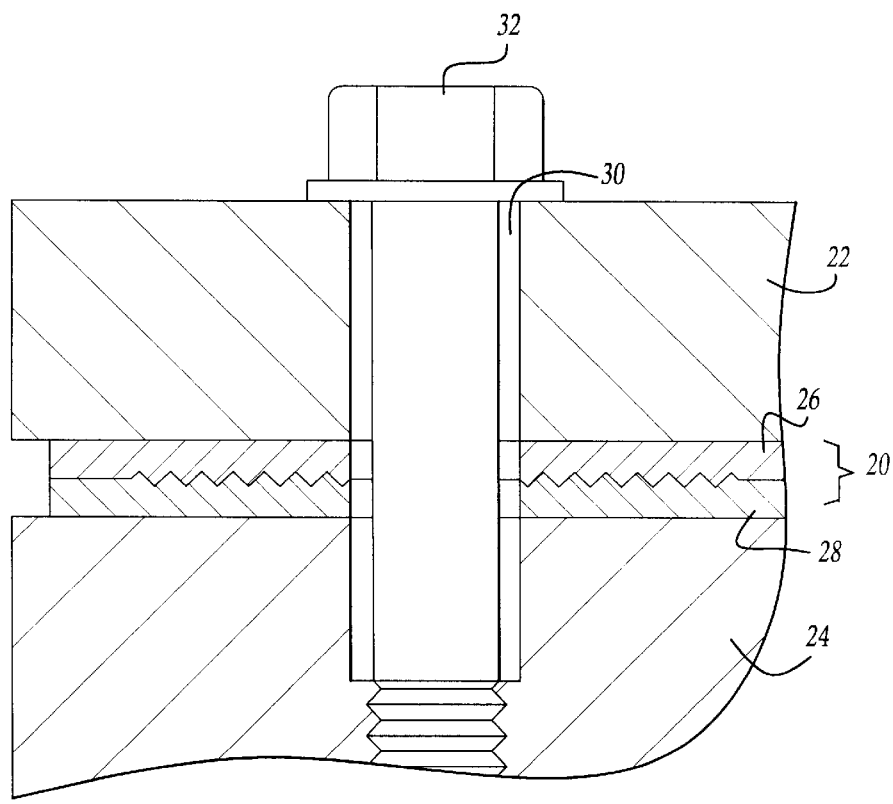
FIG. 4 is a cross-sectional view of the cylinder head gasket assembled between the mating mechanical components taken along lines 4—4 in FIG. 1.

Troughs 44 preferably extend inwardly from engagement surfaces 38 and 40. Conversely, peaks 46 extend outwardly beyond engagement surfaces 38 and 40. The depth $d_1$ of each trough 44 in both first and second gasket layers 26 and 28 corresponds to the height $h_1$ of each peak 46 in first and second gasket layers 26 and 28 such that the gripping members 36 of each gasket layer 26 and 28 are mirror images of one another Thus, gripping members 36 of each gasket layer 26 and 28 matingly mesh together when engagement surfaces 38 and 40 are brought into face-to-face engagement with one another, to align and secure first and second gasket layers 26 and 28 together against lateral movement, as explained in greater detail below. In one embodiment, each trough 44 has a uniform depth $d_1$ and each peak 46 has a uniform height $h_1$ as seen in FIGS. 3–4. In one embodiment, the depths and heights of troughs 44 and peaks 46, respectively, may be varied, as seen in FIG. 6, thereby insuring only one proper alignment position when first and second gasket layers 26 and 28 are brought into face-to-face engagement with one another, as noted above. Alternatively, in another embodiment, first gasket layer 26 may be provided with a specialized trough 44' (shown in phantom in FIG. 3) and second gasket layer 28 may be provided with a specialized peak 46' (shown in phantom in FIG. 3), wherein trough 44' must be aligned with peak 46' to properly mesh engagement surfaces 38 and 40 of first and second gasket layers 26 and 28, respectively, thereby insuring the proper alignment of first and second gasket layers 26 and 28.

Figure 2:
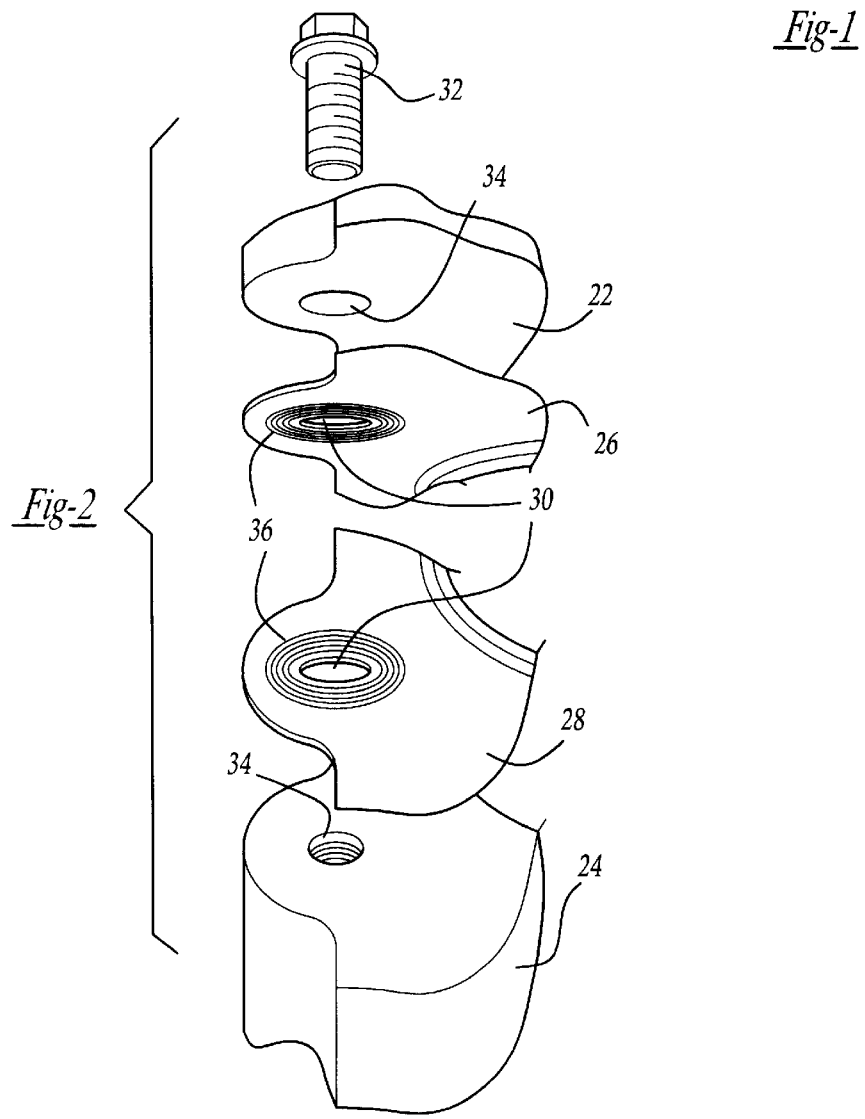
FIG. 2 is an exploded view of a section of the cylinder head gasket positioned between mating mechanical components, wherein the gasket layers incorporate meshing gripping members in accordance with the present invention.

With reference to FIGS. 2 and 4, the use of gripping members 36 to interlock first and second gasket layers 26 and 28 together is illustrated. First gasket layer 26 is positioned adjacent to second gasket layer 28 in an overlying manner whereby bolt holes 30 and combustion bores 32 of each gasket layer 26 and 28 are aligned. Engagement surfaces 38 and 40 of first and second gasket layers 26 and 28, respectively are brought into face-to-face engagement such that troughs 44 of second gasket layer 28 receive peaks 46 of first gasket layer 26 and troughs 44 of first gasket layer 26 receive peaks 46 of second gasket layer 28 to mesh together in a mating, gripping engagement. Gasket layers 26 and 28 are then subjected to a compressive force by positioning mating mechanical components 22 and 24 against opposing sealing surfaces 48 and 50 of first and second gasket layers 26 and 28, respectively such that bolt holes 34 are aligned with bolt holes 30 in gasket layers 26 and 28. Bolt 32 is next positioned so as to extend through bolt holes 30 and 34 and secure mechanical components 22 and 24 together with gasket 20 therebetween serving as a seal. Due to the compressive force generated by mechanical components 22 and 24, peaks 46 of one gasket layer are trapped within troughs 44 of the mating gasket layer such that peaks 46 are prevented against laterally movement by sidewalls 52 of troughs 44, thereby interlocking first and second gasket layers 26 and 28 together. Under some circumstances, depending upon the gasket material being employed, gripping members 36 may undergo a material deformation as part of a mechanical locking mechanism to provide more than lateral restraint. Thus, first and second gasket layers 26 and 28 are prevented against at least lateral sliding with respect to one another when gasket 20 is subjected to frictional forces generated by moving mechanical components during engine operation, without requiring a separate bonding operation, such as welding. Gripping members 36 further serve as a self-aligning mechanism for first and second gaskets layers 26 and 28, as troughs 44 and peaks 46 must be properly meshed together for first and second gasket layers 26 and 28 to be assembled together in face-to-face engagement.

Gripping members 36 may also be used with more than two metallic gasket layers. For example, referring to FIG. 5, to use gripping members 36 with a three layer metallic gasket, a third gasket layer 54 is provided having a bolt hole 56 that corresponds to bolt holes 30 and 34, and two engagement surfaces 58 and 60. In accordance with the invention, both engagement surfaces 58 and 60 are provided with gripping members 36 disposed thereon. Gripping members 36 of engagement surface 58 meshes with gripping members of engagement surface 38 and the gripping members 36 disposed on engagement surface 60 mesh with gripping members 36 disposed on engagement surface 40 in the manner described above thereby securing third gasket layer 54 between first and second gasket layers 26 and 28, respectively.

While gripping members 36 have been shown as being disposed around the periphery of bolt holes 30 and 56, it is understood that the invention may be modified with gripping members 36 being provided on other locations of the gasket layers 26 and 28.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A multiple layer metallic sealing gasket assembly for providing a seal between mating mechanical components, comprising:
   a first metallic gasket layer having an engagement surface, a sealing surface and at least a first aperture formed therein, wherein said engagement surface is provided with a plurality of gripping members thereon; and
   a second metallic gasket layer having an engagement surface and a sealing surface and at least a second aperture formed therein, wherein said engagement surface of said second gasket layer is provided with a plurality of gripping members thereon,
   wherein said engagement surfaces of said first and second metallic gasket layers are positioned in face-to-face engagement such that said first and second apertures are aligned with one another, said gripping members on said engagement surfaces of said first and second gasket layers meshing together so as to interlock said first and second gasket layers together in proper alignment prior to compression of said gasket layers between said mating components.

2. The gasket assembly of claim 1, wherein said gripping members are formed adjacent a periphery of said first and second apertures.

3. The gasket assembly of claim 2, wherein said gripping members are positioned so as to extend outwardly from said corresponding engagement surfaces.

4. The gasket assembly of claim 1, wherein said gripping members are positioned so as to be spaced a predetermined distance from a periphery of said first and second apertures.

5. The gasket assembly of claim 1, further including a fastener, wherein said first and second apertures receive said fastener to secure said first gasket layer to said second gasket layer, said fastener cooperating with mating mechanical components disposed against said sealing surfaces of said first and second gasket layers to exert a compressive force against said first and second gasket layers to retain said gripping members said first and second layers meshed together, thereby interlocking said first and second gasket layers against lateral movement with respect to one another.

6. The gasket assembly of claim 5, wherein said mating mechanical components further include at least one aperture formed therethrough, said aperture corresponding to said first and second apertures in said first and second gasket layers and receive said fastener to secure said mating mechanical components together with said gasket therebetween.

7. The gasket assembly of claim 1, wherein all of said gripping members have a uniform size.

8. The gasket assembly of claim 1, wherein all of said gripping members have a uniform shape.

9. A multiple layer metallic sealing gasket assembly for providing a seal between mating mechanical components, comprising:
   a first metallic gasket layer having an engagement surface, a sealing surface and at least a first aperture formed therein, wherein said engagement surface is provided with a plurality of first gripping members thereon, said first gripping members extending radially outwardly from a periphery of said first aperture; and
   a second metallic gasket layer having an engagement surface, a sealing surface and at least a second aperture formed therein, wherein said engagement surface of said second gasket layer is provided with a plurality of second gripping members thereon, said second gripping members extending radially outwardly from a periphery of said second aperture;
   wherein said first and second gripping members each include alternating troughs and peaks, said troughs being formed so as to have a uniform depth and said peaks of said first and second gasket layers are formed so as to have a uniform height, said depth of said troughs of both first and second gasket layers corresponding to said height of said peaks of both first and second gasket layers;
   said peaks of said first gasket layer matingly engaging with troughs of said second gasket layer and said peaks of said second gasket layer mesh together with said troughs of said first gasket layer when said first and second gasket layers are brought into face-to-face engagement with one another and said first and second apertures are aligned, thereby interlocking said first and second gasket layers together in proper alignment and preventing lateral movement of said first and second gasket layers with respect to one another.

10. The gasket assembly of claim 9, further including a fastener, wherein said first and second apertures receive said fastener to secure said engagement surfaces of said first gasket layer to said second gasket layer in face-to-face engagement, said fastener cooperating with mating mechanical components disposed against said sealing surfaces of said first and second gasket layer to exert a compressive force against said first and second gasket layers to mesh together said peaks of said first and second gasket layers with said troughs of said first and second gasket layers, thereby interlocking said first and second gasket layers against lateral movement with respect to one another.

11. The gasket assemble of claim 9, further including a third gasket layer having two engagement surfaces and an aperture formed therethrough, said aperture corresponding to said first and second apertures, said engagement surfaces being provided with gripping members around the periphery of said aperture; said third gasket layer being positioned between said first and second gasket layers such that said engagement surfaces of said first and second gasket layers are brought into face-to-face engagement with said engagement surfaces of said third gasket layer such that said gripping members mesh together to interlock said gasket layers together and prevent lateral movement of said gasket layers with respect to one another.

12. The gasket assembly of claim 11, wherein said troughs extend inwardly from said engagement surfaces of said first and second gasket layers.

13. The gasket assembly of claim 12, wherein said peaks extend outwardly beyond said engagement surfaces of said first and second gasket layers.

14. The gasket assembly of claim 11, wherein said troughs of said first and second gasket layers are formed so as to have a uniform depth and said peaks of said first and second gasket layers are formed so as to have a uniform height.

15. The gasket assembly of claim 14, wherein said depth of said troughs is equal to said height of said peaks.

16. The gasket assembly of claim 11, wherein said troughs of said first and second gasket layers have varying predetermined depths and said peaks of said first and second gasket layers are formed so as to have varying predetermined heights.

17. The gasket assembly of claim 16, wherein each trough having a predetermined depth of said first gasket layer matingly engages with a peak of said second gasket layer having a predetermined height that corresponds with said predetermined depth of said trough.

18. The gasket assembly of claim 11, further including at least one specialized trough on said first gasket layer and at least one specialized corresponding peak on said second gasket layer, wherein said first and second gasket layers become aligned with one another when said at least one specialized trough is aligned with said at least one specialized corresponding peak.

19. A multiple layer metallic sealing gasket assembly for providing a seal between mating mechanical components, comprising:

a first metallic gasket layer having an engagement surface, a sealing surface and at least a first aperture formed therein, wherein said engagement surface is provided with a plurality of gripping members thereon; and a second metallic gasket layer having an engagement surface and a sealing surface and at least a second aperture formed therein, wherein said engagement surface of said second gasket layer is provided with a plurality of gripping members thereon, wherein said gripping members have a generally V-shaped cross-section, such that said gripping members have alternating troughs and peaks, said peaks of said first gasket layer meshing together with troughs of said second gasket layer and said peaks of said second gasket layer meshing together with said troughs of said first gasket layer when said first and second gasket layers are brought into face-to-face engagement with one another, thereby interlocking said first and second gasket layer together to prevent lateral movement of said first and second gasket layers with respect to one another;

wherein said engagement surfaces of said first and second metallic gasket layers are positioned in face-to-face engagement such that said first and second apertures are aligned with one another, said gripping members on said engagement surfaces of said first and second gasket layers meshing together so as to interlock said first and second gasket layers together in proper alignment.

20. A multiple layer metallic sealing gasket assembly for providing a seal between mating mechanical components, comprising:

a first metallic gasket layer having an engagement surface, a sealing surface and at least a first aperture formed therein, wherein said engagement surface is provided with a plurality of first gripping members thereon, said first gripping members extending radially outwardly from a periphery of said first aperture; and a second metallic gasket layer having an engagement surface, a sealing surface and at least a second aperture formed therein, wherein said engagement surface of said second gasket layer is provided with a plurality of second gripping members thereon, said second gripping members extending radially outwardly from a periphery of said second aperture;

wherein said first and second gripping members each include alternating troughs and peaks, wherein said troughs have varying predetermined depths and said peaks are formed so as to have varying predetermined heights, wherein each trough having a predetermined depth of said first gasket layer matingly engages with a peak of said second gasket layer having a predetermined height that corresponds with said predetermined depth of said trough when said first and second gasket layers are positioned in face-to-face engagement, thereby interlocking said first and second gasket layers together in proper alignment and preventing lateral movement of said first and second gasket layers with respect to one another.

21. The gasket assembly of claim 20, further including a third gasket layer having two engagement surfaces and an aperture formed therethrough, said aperture corresponding to said first and second apertures, said engagement surfaces being provided with gripping members around the periphery of said aperture; said third gasket layer being positioned between said first and second gasket layers such that said engagement surfaces of said first and second gasket layers are brought into face-to-face engagement with said engagement surfaces of said third gasket layer such that said gripping members mesh together to interlock said gasket layers together and prevent lateral movement of said gasket layers with respect to one another.

* * * * *